United States Patent Office 3,733,395
Patented May 15, 1973

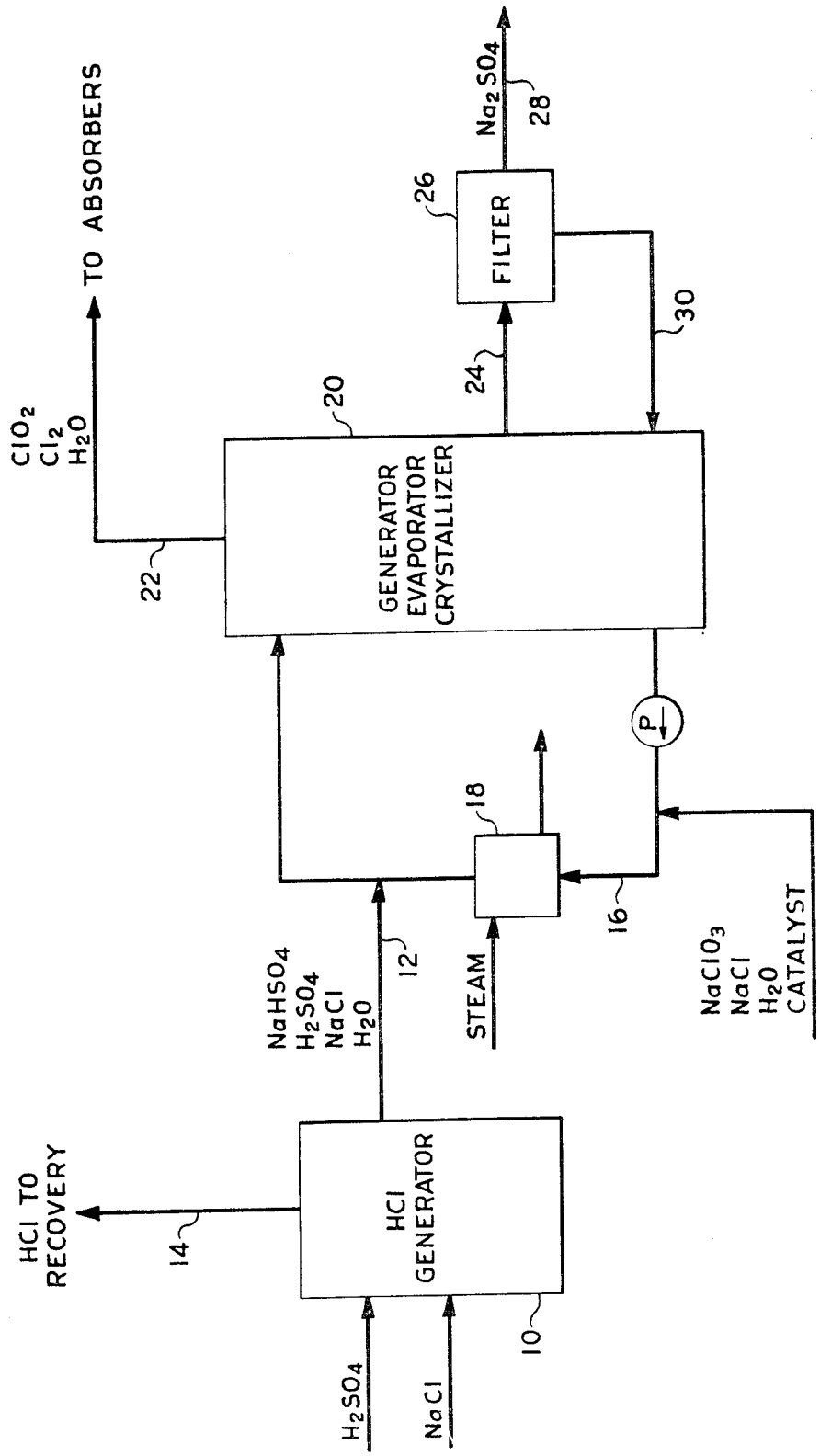

3,733,395
PROCESS FOR PRODUCING CHLORINE DIOXIDE, CHLORINE AND A NEUTRAL SULFATE SALT IN THE SULFATE OR KRAFT PROCESS OF PREPARING WOOD PULP
Willard A. Fuller, Grand Island, N.Y., assignor to Hooker Chemical Corporation, Niagara Falls, N.Y.
Filed Apr. 7, 1971, Ser. No. 132,037
Int. Cl. C01b 11/02; C01d 7/02, 5/02
U.S. Cl. 423—478
10 Claims

ABSTRACT OF THE DISCLOSURE

A continuous process is provided for the production of chlorine dioxide, chlorine and a neutral sulfate salt which comprises feeding a chlorate, a reducing agent, a bisulfate and sulfuric acid to a chlorine dioxide generator to form an aqueous reaction solution which is maintained at a temperature of from about 50 to about 100 degrees centigrade, at a pressure from about 50 millimeters mercury absolute to about atmospheric pressure, while maintaining the concentration of said chlorate from about 0.2 to about 2.5 moles per liter; maintaining the concentration of said reducing agent from about 0.2 to about 2.5 moles per liter; maintaining the acidity of said reaction solution between about 2 to about 6 normal in sulfuric acid and coordinating the bisulfate feed rate with the sulfuric acid feed rate to provide an acid hydrogen radical to sulfate radical ratio from about 1.05–1.95. The bisulfate feed material as well as a portion of the reducing agent, in the form of an alkali metal chloride, is advantageously supplied from the by-product of the reaction of sodium chloride with concentrated sulfuric acid to produce hydrochloric acid.

BACKGROUND OF THE INVENTION

This invention relates to a process for producing salt cake ($Na_2SO_4$) for use in the sulfate or kraft process of preparing wood pulp for bleaching.

Basically, the kraft process involves digestion of cellulosic material such as wood chips with an aqueous solution (cooking liquor) containing sodium sulfide in combination with sodium hydroxide to dissolve lignin, resins, hemicellulosic material and other substances. The remaining suspension of cellulose fibers is separated from the extracted material, washed and bleached in one or more bleach stages generally defined by the reagent employed, such as chlorine dioxide, chlorine, hypochlorite and caustic extraction.

The used cooking liquor is evaporated and the organic material in the residue is burned to produce heat and a molten inorganic material known as smelt, which is dissolved in water, treated with lime to regenerate sodium hydroxide, fortified with additional sodium and sulfur values to replace losses sustained in the process, and re-used to cook more wood chips.

It is customary to employ the liquid effluent from a chlorine dioxide generator, which contains sodium and sulfate ions as well as free sulfuric acid as a source of the sodium and sulfur required to fortify the cooking liquor. When the liquid effluent from a chlorine dioxide generator is insufficient to provide the necessary quantity of sodium and sulfur for make-up in the cooking liquor, purchased sodium sulfate may be employed to make-up the cooking liquor. However, in some situations where a cheap source of sodium sulfate is not available it is imperative that a source of this ingredient for kraft pulp mill operation be developed.

The demand for salt cake ($Na_2SO_4$) in some kraft paper production installations is sufficiently great to warrant the installation of Mannheim type furnace equipment for the sole purpose of producing salt cake without special regard from an economic view for the utilization of the hydrochloric acid produced.

Hydrochloric acid is commercially produced in a Mannheim furnace by the endothermic reaction of salt (NaCl) and sulfuric acid ($H_2SO_4$) which proceeds in two steps:

(1) $NaCl + H_2SO_4 \rightarrow HCl + NaHSO_4 + H_{18° C.}$ 0.89 kilocalories
(2) $NaCl + NaHSO_4 \rightarrow HCl + Na_2SO_4 + H_{18° C.}$ 15.21 kilocalories The reaction requires $\Delta H_{18° C.} + 16.10$ kilocalories to go to completion although the first reaction proceeds at a relatively low temperature, the bulk of the heat being consumed in the second reaction. The HCl produced may be used directly or absorbed in water.

Essentially, the process involves roasting the salt and sulfuric acid in a furnace such as a Mannheim or rotary furnace to produce HCl and salt cake. The HCl is cooled, purified to remove any $H_2SO_4$ or salt cake impurities, and absorbed in water to liberate about 700 B.t.u./lb. of HCl absorbed.

The salt cake ($Na_2SO_4$) produced in the salt-sulfuric acid process provides a supply of sodium sulfate for use in the kraft pulp process for the cooking liquor which serves to delignify the wood pulp in the first stage of wood pulp digestion.

Another method which may be used to supply sodium sulfate to a kraft pulp mill is to increase the amount of sodium sulfate produced in a chlorine dioxide generator. This may be done by increasing the quantities of sodium chlorate, sodium chloride and sulfuric acid fed to the reaction solution. By this method, an increase in sodium sulfate production is obtained with a corresponding increase in chlorine production.

It is an object of this invention to increase the sodium sulfate production of a chlorine dioxide producing facility without increasing the amount of chlorine produced.

SUMMARY OF THE INVENTION

In accordance with this invention, there is provided a continuous process for the production of chlorine dioxide, chlorine and a neutral sulfate salt which comprises;

(a) Feeding a chlorate, a reducing agent, a bisulfate and sulfuric acid to a chlorine dioxide generator to form an aqueous reaction solution;
(b) Maintaining the temperature of said reaction solution from about 25 degrees centigrade to the boiling temperature;
(c) Maintaining the pressure in said chlorine dioxide generator from about 20 millimeters of mercury absolute to about atmospheric pressure;
(d) Maintaining the concentration of said chlorate from about 0.2 to about 2.5 moles per liter;
(e) Maintaining the concentration of said reducing agent from about 0.2 to about 2.5 moles per liter;
(f) Maintaining the acidity of said reaction solution between about 2 to about 6 normal in sulfuric acid and
(g) Coordinating the bisulfate feed rate with the sulfuric acid feed rate to provide an acid hydrogen radical to sulfate radical ratio from about 1.05–1.95:1.

By the process of this invention, the production of salt cake ($Na_2SO_4$) may be increased by a factor of up to 100 percent over the amount of salt cake produced by conventional chlorine dioxide generators operating on sulfuric acid alone. Thus, a conventional chlorine dioxide generator operating with $H_2SO_4$ produces salt cake in accordance with the equation:

$2NaClO_3 + 2NaCl + 2H_2SO_4 \rightarrow 2ClO_2 + Cl_2 + 2Na_2SO_4 + 2H_2O$ whereas salt cake is produced by the process of this invention in accordance with the equation:

2NaClO₃+2NaCl+4NaHSO₄→2ClO₂
+Cl₂+4Na₂SO₄+2H₂O

Of course a smaller amount of salt cake is produced as a result of the reaction of sulfuric acid in addition to or in place of a portion of the NaHSO₄ fed to the chlorine dioxide generator. Since many Kraft pulp mills require more neutral sodium sulfate than can be obtained from the chlorine dioxide generator operating solely on sulfuric acid, it is a preferred mode of practice of the instant invention to coordinate the bisulfate feed rate with the sulfuric acid feed rate to provide an acid hydrogen radical to sulfate radical ratio from about 1.05–1.60:1 and even more preferably from about 1.05–1.40:1.

Thus, in the practice of the instant invention, the acid values of a bisulfate salt are utilized in the production of chlorine dioxide while markedly increasing the amount of neutral sodium sulfate produced in the chlorine dioxide generating process.

An ideal source of bisulfate salt for use in the chlorine dioxide generation facility of a bleach plant is the by-product of the reaction of concentrated sulfuric acid with an alkali metal chloride represented in Equation 1, supra. With proper control of the reaction conditions of Equation 1, the product, after removal of gaseous HCl, constitutes a mixture of the bisulfate, chloride and sulfuric acid. This mixture, in slurry form, provides not only the bisulfate salt desired, but also provides at least a portion of the reducing agent needed for the reduction of the chlorate to produce chlorine dioxide. Thus, the excess alkali metal chloride provides the reducing agent for the alkali metal chlorate, alone or in addition to sulfur dioxide, if use of the latter reagent is desired.

Thus, in accordance with this invention, there is provided a continuous process for the production of hydrogen chloride, chlorine dioxide, chlorine and a neutral sulfate salt, which comprises;

(a) Heating sodium chloride with concentrated sulfuric acid to a temperature above about 30 degrees centigrade for from about 15 to 60 minutes to produce 1 mole equivalent of hydrogen chloride based upon the sulfuric acid, and an aqueous mixture containing sodium bisulfate and sodium chloride;

(b) Recovering said hydrogen chloride;

(c) Passing said mixture of sodium bisulfate and sodium chloride to an aqueous reaction solution containing a chlorate, a reducing agent and sulfuric acid;

(d) Maintaining the temperature of said reaction solution between about 25 degrees centigrade, to the boiling temperature;

(e) Maintaining the pressure in said chlorine dioxide generator from about 20 millimeters of mercury absolute to about atmospheric pressure;

(f) Maintaining the concentration of said chlorate from about 0.2 to about 2.5 moles per liter;

(g) Maintaining the concentration of said reducing agent from about 0.2 to about 2.5 moles per liter;

(h) Maintaining the acidity of said reaction solution between about 2 to about 6 normal in sulfuric acid; and (i) Coordinating the bisulfate feed rate with the sulfuric acid feed rate to provide an acid hydrogen radical to sulfate radical ratio from about 1.05–1.95:1.

The overall effect of the instant invention provides considerable savings in the cost of heat energy by omitting the second step in the reaction of sulfuric acid with sodium chloride in the production of sodium sulfate and hydrogen chloride, which requires about 15.21 kilocalories of heat, while providing the quantity of salt cake desired for digestion of cellulosic materials, with the production of both hydrogen chloride and chlorine dioxide as additional desirable products, the latter being directly utilizable in the kraft bleaching mill process. Furthermore, conventional equipment employed in the conversion of sodium chloride and sulfuric acid to neutral sodium sulfate such as the Mannheim furnace or rotary furnace may be dispensed with by following the process of the instant invention. The equipment conventionally employed in the salt-sulfuric acid process for the production of sodium sulfate is such that it is capable of withstanding temperatures in the region of 900 degrees centigrade.

By limiting the reaction of sodium chloride with concentrated sulfuric acid to produce 1 mole of hydrogen chloride per mole of sulfuric acid and a bisulfate salt product, the reaction conditions are considerably milder than that employed in the salt-sulfuric acid process. In essence, dry sodium chloride is reacted with concentrated sulfuric acid in the form of a slurry by heating the mixture to a temperature above about 30 degrees centigrade for from about 15 to 60 minutes to produce one mole equivalent of hydrogen chloride based upon the sulfuric acid reactant and an aqueous mixture containing an alkali metal bisulfate and chloride. Specifically, one mole of HCl gas is generated from solid NaCl and concentrated sulfuric acid at 31° C. in about 30 minutes. By raising the temperature, the reaction time is shortened. Thus, conditions may be selected so that generally a temperature between about 30–150° C. will provide the desired reaction in from about 15 to 45 minutes. The hydrogen chloride produced in the reaction of concentrated sulfuric acid with dry sodium chloride may be recovered as hydrogen chloride or it may be converted to a concentrated or dilute hydrochloric acid solution by dissolving it in water.

The reaction of concentrated sulfuric acid with an alkali metal chloride need not be conducted on the dry alkali metal chloride, but may be performed using a saturated aqueous solution of alkali metal chloride by bringing the reaction mixture to the boil and removing a constant boiling mixture of hydrochloric acid. The desired reactant material for use in the generation of chlorine dioxide is thereby produced by withdrawing hydrochloric acid at the boiling temperature of the concentrated sulfuric acid-saturated sodium chloride solution until it is reduced nearly to dryness, at which point one mole of hydrochloric acid per mole of sulfuric acid has been generated. However, it is possible to stop this reaction at any intermediate point with the resulting aqueous solution containing sodium chloride, concentrated sulfuric acid and sodium bisulfate for use in the chlorine dioxide generating reaction.

Sulfuric acid must be fed with the sodium bisulfate and sodium chloride to the chlorine dioxide generator to maintain an acid concentration above approximately 2 normal, below which chlorine dioxide generation is not feasible for commercial operation.

A chlorine dioxide generating facility suitable for conversion of sodium bisulfate to neutral sodium sulfate is disclosed in U.S. 3,563,702 as a unilocular generator-evaporator-crystallizer vessel. By a unilocular vessel, applicant means a vessel containing one chamber free from internal zoning structure within its envelope, in which chamber the process steps of generation of chlorine dioxide, production of sodium sulfate and the evaporation of water are simultaneously performed, the reactants being continuously fed to the reaction solution within the vessel and the products being withdrawn from that reaction solution. The use of a single vessel (unilocular generator-evaporator-crystallizer for the product of neutral sodium sulfate and chlorine dioxide is additionally advantageous from the standpoint that no acid effluent leaves the vessel, thereby overcoming the pollution problem attending the use of conventional chlorine dioxide generating equipment.

The process of this invention may employ other chloride salts for reaction with sulfuric acid to produce the metal bisulfate salt. However, the preferred metal chloride as well as the metal chlorate used to produce chlorine dioxide are sodium salts because of ready availability and cost considerations.

DETAILED DESCRIPTION OF THE INVENTION

The reaction parameters for operation of a chlorine dioxide generator to which a bisulfate salt is fed as a partial source of hydrogen and sulfate values are presented in tabular form for simplicity as the acceptable conditions for a commercial operation (column 1), more desirable conditions (column 2) and the most desired conditions (column 3). It must be recognized that in the continuous operation of a commercial plant on a large scale, the conditions of reaction are dynamic rather than static and that the parameters expressed in the table represent average values for a condition over a given time period. Variation from that average value is preferably minimized by automatic control systems.

TABLE

| Reaction conditions | (1) | (2) | (3) |
| --- | --- | --- | --- |
| Temperature, °C | 25–boil | 25–90 | 50–85 |
| Pressure, mm. Hg, absolute | 20 atmos | 20–400 | 100–300 |
| Chlorate, molarity | 0.2–2.5 | 0.5–2.5 | 0.5–2.0 |
| Chloride, molarity | 0.2–2.5 | 0.5–2.5 | 0.5–2.0 |
| $H_2SO_4$, normality | 2.0–6.0 | 2.0–5.0 | 2.0–4.5 |
| $H_2SO_4$ and $NaHSO_4$ hydrogen to sulfate ratio. | 1.05–1.95:1 | 1.0–1.60:1 | 1.05–1.40:1 |

The salt cake produced is removed from the chlorine dioxide generator as a slurry of crystals which are recovered by any known means, such as by filtration, the mother liquor being recycled to the reaction solution for the production of more chlorine dioxide. The salt cake may be then introduced into the chemical recovery system of a Kraft pulping process usch as that disclosed in U.S. 3,366,534.

The unilocular chlorine dioxide generator evaporator-crystallizer is evacuated by known means, such as a steam syphon ejector, to remove the gaseous products of reaction as well as water vapor from the reaction solution. The water vapor is withdrawn, by coordinating temperature and pressure, in an amount sufficient to maintain a substantially constant volume of reaction solution. The withdrawn water vapor serves to dilute the chlorine dioxide and prevent the development of explosive concentrations of gas. The chlorine dioxide is then absorbed in water for use in the bleach mill.

The sodium chlorate and sodium chloride reactants may be introduced into the unilocular generator-evaporator-crystallizer as separate feeds or as a single aqueous solution. The ratio of chloride to chlorate may be varied as desired, but it is generally preferred to maintain a slight excess of chloride ion in the reaction solution. For example, a chloride to chlorate molar ratio from 1:1 to about 1.3:1 is preferred. A large excess of chloride in the reaction solution may result in the crystallization of some sodium chloride with the sodium sulfate product. Likewise, a sodium chlorate concentration in the reaction solution approaching a saturated solution may cause complete solidification of the vessel contents. Therefore, the concentration of sodium chlorate must be kept below about 3.5 molar at the higher reaction solution temperatures.

The reaction of a chlorate with a chloride in the presence of a bisulfate for the production of chlorine dioxide and chlorine in a unilocular generator-evaporator-crystallizer under the conditions presented herein, is performed in the presence of a catalytic amount of at least one member of the group consisting of silver ions, manganese ions, dichromate ions, arsenic ions, and vanadium pentoxide.

The silver ions is the most preferred catalyst. From about 0.0001 to about 1.5 grams of silver ion per liter of reaction solution should be used. Although more than about 1.5 grams of silver ion may be used, one does not obtain a significant increase in chlorine dioxide efficiency with the excess amount of silver ions.

The manganous ion is another preferred catalyst which may be employed in amounts from about 0.001 to about 4 grams of manganous ion per liter of reaction solution. Again, more than 4 grams of manganous ion per liter of reaction solution may be used, but no significant increase in chlorine dioxide efficiency is observed with an excess amount of said ion.

Mixtures of the silver and manganous ion are especially noteworthy in that the chlorine dioxide efficiency of the reaction appears to be very high with the mixed catalyst, while employing small amounts of silver ion than are equally operable when silver alone is used.

The dichromate ion, especially in its sodium salt form, is another preferred catalyst. It should be used at concentrations of from about 0.5 to about 25 grams per liter. More than 25 grams per liter of reaction solution do not appreciably increase the chlorine dioxide efficiency of the reaction.

The arsenic ion and vanadium pentoxide may be employed in concentrations from about 0.5 to about 25 grams per liter with good chlorine dioxide efficiency.

In practice, the invention may be best understood by reference to the drawing, in which the figure represents a flow diagram of the process. Essentially, sodium chloride and sulfuric acid are introduced into reactor 10 as separate streams of material. The sodium chloride is fed to reactor 10 dry or as a saturated or nearly saturated aqueous solution. The reactor 10 is operated over 30° C. and normally at or near the boil to convert the sodium chloride to HCl. An effluent stream containing soldium bisulfate ($NaHSO_4$), water and any excess sulfuric acid is removed from reactor 10, cooled and diluted if necessary, and introduced into the (unilocular) generator-evaporator-crystallizer 20 via line 12. Any residual amounts of HCl and NaCl in the effluent stream from reactor 10 need not be recovered because they are not detrimental to the operation of chlorine dioxide generation in vessel 20. The HCl product from the salt-sulfuric acid reactor 10 is conducted to absorbers via line 14 for recovery. The supply of sodium chlorate, sodium chloride, and catalyst make-up are fed to vessel 20 via circulation half loop 16 prior to the point of introduction of sodium bisulfate and preferably before heat exchanger 18. The chlorine dioxide and chlorine produced in vessel 20 are removed with water vapor and passed by line 22 to absorbers for recovery. The solid sodium sulfate ($Na_2SO_4$) produced in vessel 20 is removed as a slurry by line 24, filtered at 26 and recovered via line 28 for use in cooking liquor made-up in sulfate or kraft pulp mill operations. The filtrate is returned to reactor 20 through line 30.

EXAMPLE 1

A combined sodium bisulfate reactor and a unilocular chlorine dioxide generator-evaporator-crystallizer as depicted in the figure presented, are continuously operated by introducing into the $NaHSO_4$ reactor about 34.5 tons per day of concentrated sulfuric acid and an aqueous solution of sodium chloride in an amount to provide about 16.1 tons NaCl per day. The $NaHSO_4$ reactor is operated at the boiling temperature of the solution to produce 10 tons per day of HCl, which is fed to absorbers for recovery. The $NaHSO_4$ reactor is sparged with steam, air or other inert gases to remove the HCl produced. The acid sodium bisulfate solution produced in the $NaHSO_4$ reactor is continuously or intermittently, as desired, removed by overflow and passed to a chlorine dioxide generator as an aqueous solution containing about 33 tons per day of $NaHSO_4$ and 7.5 tons per day of $H_2SO_4$. To the chlorine dioxide generator, operating under a vacuum of about 200 millimeters mercury, absolute, and at a temperature of about 75 degrees centigrade is fed in a stream separate from the acid stream, an aqueous solution containing sodium chlorate and sodium chloride in amounts supplied to provide about 21.7 tons per day sodium chlorate and about 14.3 tons per day of sodium chloride. The chlorine dioxide generator produces about 13 tons per day of chlorine dioxide and about 9.1 tons per day of chlorine in addition to about 50 tons per day of neutral sodium sulfate ($Na_2SO_4$). The silver ion catalyst present in the chlorine dioxide reaction solution is maintained by continuous or intermittent introduction with the aqueous sodium chlorate-sodium chloride solution to maintain a high chlorine dioxide efficiency during the reaction.

It is to be understood that the preceding example is presented by way of illustration and that the scope of the invention is not limited thereto. The other catalysts may be substituted for the silver ion catalyst specifically described with equivalent results. Likewise, the amounts of reactants employed may be varied widely to achieve the results recognizable to those of average skill in the art to flow from the disclosed invention.

What is claimed is:

1. A continuous process for the production of chlorine dioxide, chlorine and a neutral sulfate salt which comprises;
   (a) feeding a chlorate, a chloride, a bisulfate and sulfuric acid to a chlorine dioxide generator to form an aqueous reaction solution;
   (b) maintaining the temperature of said reaction solution between about 50 to 100 degrees centigrade;
   (c) maintaining the pressure of said chlorine dioxide generator from about 20 millimeters mercury absolute to about atmospheric pressure;
   (d) maintaining the concentration of said chlorate from about 0.5 to about 2.5 moles per liter;
   (e) maintaining the concentration of said chloride from about 0.5 to about 2.5 moles per liter;
   (f) maintaining the acidity of said reaction soltuion between about 2 to about 6 normal in sulfuric acid; and
   (g) coordinating the bisulfate feed rate with the sulfuric acid feed rate to provide an acid hydrogen radical to sulfate radical ratio from about 1.05–1.95:1.

2. The process of claim 1 in which the acid normality of said reaction solution is maintained between 2 and about 5 normal in sulfuric acid.

3. The process of claim 2 in which the bisulfate feed rate is coordinated with the sulfuric acid feed rate to provide an acid hydrogen radical to sulfate radical ratio from about 1.05–1.60:1.

4. The process of claim 1 in which the acid normality is maintained between about 2 to 4.5 normal in sulfuric acid.

5. The process of claim 4 in which the bisulfate feed rate is coordinated with the sulfuric acid feed rate to provide an acid hydrogen radical to sulfate radical ratio from about 1.05–1.40:1.

6. The process of claim 1 in which the process is performed in the presence of at least one catalyst selected from the group consisitng of vanadium pentoxide, dichromate ions, silver ions, manganese ions and arsenic ions.

7. The process of claim 6 in which the process is conducted at a pressure from about 20 to about 400 millimeters mercury absolute at a temperature from about 25 to about 95 degrees centigrade, said temperature and said pressure being coordinated to effect evaporation of water from said aqueous reaction solution in an amount sufficient to maintain a substantially constant reaction solution volume.

8. A continuous process for the production of hydrogen chloride, chlorine dioxide, chlorine and a neutral sulfate salt, which comprises:
   (a) heating sodium chloride with concentrated sulfuric acid to a temperature above about 30 degrees centigrade for from about 15 to 60 minutes to produce 1 equivalent of hydrogen chloride and an aqueous mixture containing sodium bisulfate and sodium chloride;
   (b) recovering said hydrogen chloride;
   (c) passing said mixture of sodium bisulfate and sodium chloride to an aqueous reaction solution to which is also fed a chlorate, a chloride and sulfuric acid;
   (d) maintaining the temperature of said recation solution between about 50 to 100 degrees centigrade;
   (e) maintaining the pressure of said chlorine dioxide generator from about 20 millimeters mercury absolute to about atmospheric pressure;
   (f) maintaining the concentration of said chlorate from about 0.5 to about 2.5 moles per liter;
   (g) maintaining the concentration of said chloride from about 0.5 to about 2.5 moles per liter.
   (h) maintaining the acidity of said reaction solution between about 2 to about 6 normal in sulfuric acid, and
   (i) coordinating the bisulfate feed rate with the sulfuric acid feed rate to provide an acid hydrogen radical to sulfate radical ratio from about 1.05–1.95:1.

9. The process of claim 8 in which the process of step (a) is conducted by reacting concentrated sulfuric acid with solid sodium chloride at a temperature from about 30 degrees centigrade to about 50 degrees centigrade for from about 15 to 45 minutes to produce one equivalent of hydrogen chloride.

10. The process of claim 8 in which step (a) is performed by heating in a saturated aqueous solution of sodium chloride with concentrated sulfuric acid at the boiling point of the solution for a time sufficient to produce 1 mole of hydrochloric acid.

References Cited

UNITED STATES PATENTS

| | | | |
|---|---|---|---|
| 1,904,190 | 4/1933 | Becher | 23—152 |
| 2,653,079 | 9/1953 | Wagner | 23—152 |
| 2,893,836 | 7/1959 | Davis et al. | 23—121 |
| 2,895,801 | 7/1959 | Northgraves et al. | 23—152 |
| 3,347,628 | 10/1967 | Sepall et al. | 23—121 |
| 3,446,584 | 5/1969 | Fuller | 23—152 X |
| 3,563,702 | 2/1971 | Partridge et al. | 23—121 |

EDWARD STERN, Primary Examiner

U.S. Cl. X.R.

423—504, 505, 552; 252—187